US006378874B1

(12) United States Patent
Dorulla

(10) Patent No.: US 6,378,874 B1
(45) Date of Patent: Apr. 30, 2002

(54) APPARATUS AND METHOD FOR PROVIDING A FERROFLUIDIC SEAL

(75) Inventor: Robin Francis Dorulla, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/439,617

(22) Filed: Nov. 12, 1999

Related U.S. Application Data
(60) Provisional application No. 60/124,555, filed on Mar. 16, 1999.

(51) Int. Cl.[7] ................................................. F16J 15/43
(52) U.S. Cl. ......................... 277/410; 277/409; 277/411
(58) Field of Search ................................. 277/410, 409, 277/411

(56) References Cited

U.S. PATENT DOCUMENTS

| | | | |
|---|---|---|---|
| 2,966,539 A | 12/1960 | Sears et al. .................... 174/47 |
| 3,262,722 A | 7/1966 | Gastineau et al. ........... 285/212 |
| 3,278,883 A | 10/1966 | Lipsey ......................... 339/14 |
| 4,171,818 A | 10/1979 | Moskowitz et al. ........... 277/80 |
| 4,340,233 A | 7/1982 | Yamamura et al. ............. 277/1 |
| 4,357,024 A | 11/1982 | Raj ................................ 277/1 |
| 4,486,026 A | 12/1984 | Furumura et al. ............. 277/80 |
| 4,552,389 A | 11/1985 | Babuder et al. ............. 285/379 |
| 4,598,914 A | 7/1986 | Furumura et al. ............. 277/80 |
| 4,604,229 A | 8/1986 | Raj et al. ..................... 252/510 |
| 4,817,964 A | 4/1989 | Black, Jr. ....................... 277/1 |
| 5,050,891 A | 9/1991 | Ishikawa ...................... 277/80 |
| 5,524,908 A | 6/1996 | Reis ........................... 277/233 |
| 6,029,978 A * | 2/2000 | Pelstring et al. ............ 277/410 |

* cited by examiner

Primary Examiner—Anthony Knight
Assistant Examiner—Enoch E. Peavey
(74) Attorney, Agent, or Firm—Moser, Patterson, & Sheridan LLP

(57) ABSTRACT

An apparatus and method are provided for sealing and electrically coupling an outer surface 170 of a shaft 175 to an inner surface 165 of a hub 160 disposed about the shaft. The invention is particularly useful for spindle motors 155 used in disc drives 100. In one embodiment, a seal 185 having a pair of annular pole pieces 270a, 270b, coupled to opposite poles of a magnet 265 is positioned between the shaft 175 and the hub 160. A nonmagnetic, electrically conductive ring 275 electrically couples the pole pieces 270a, 270b to one another and to the hub 160. In one version, the electrically conductive ring 275 includes an annular disk 300 with tabs 305 projecting from the exterior radius. The disk 300 abuts one pole piece 270b and the tabs 305 are folded over to electrically couple to the other 270a. An electrically conductive ferrofluid 280 is magnetically held between the pole pieces 270a, 270b, and the shaft 175 to form a pair of axially separated seals 290a, 290b, and to establish parallel electrical pathways.

17 Claims, 4 Drawing Sheets

APPARATUS AND METHOD FOR PROVIDING A FERROFLUIDIC SEAL

CROSS REFERENCE TO RELATED APPLICATIONS

This application claims priority from U.S. Provisional Patent Application Serial No. 60/124,555 filed Mar. 16, 1999.

FIELD OF THE INVENTION

The present invention relates generally to the field of disc drives, and more particularly to an apparatus and method for providing a reliable, low resistance electrical pathway through a ferrofluidic seal between a hub and a shaft of a spindle motor used in a disc drive.

BACKGROUND OF THE INVENTION

Disc drives, including magnetic disc drives, optical disc drives and magneto-optical disc drives, are widely used for storing information. A typical disc drive has one or more discs for storing information in a plurality of concentric circular tracks. This information is written to and read from the discs using read/write heads mounted on actuator arms which are moved from track to track across surfaces of the discs by an actuator mechanism. The discs are mounted on a spindle which is turned by a spindle motor to pass the surfaces of the discs under the read/write heads. The spindle motor generally includes a shaft fixed to a baseplate and a hub, to which the spindle is attached, having a sleeve into which the shaft is inserted. Permanent magnets attached to the hub interact with a stator winding on the baseplate to rotate the hub relative to the shaft One or more bearings between the hub and the shaft facilitate rotation of the hub.

The spindle motor also typically includes an exclusion seal to seal interfacial spaces between the hub and the shaft. This is necessary, because lubricating fluids or greases used in the bearings tend to give off aerosols or vaporous components that migrate or diffuse out of the spindle motor and into a disc chamber in which the discs are maintained. This vapor often transports other particles, such as material abraded from the bearings or other components of the spindle motor, into the disc chamber. These vapors and particles deposit on the read/write heads and the surfaces of the discs, causing damage to the discs and the read/write heads as they pass over the discs. Thus, the migration of these contaminants into the disc chamber must be prevented.

To prevent the migration of these contaminants into the disc chamber, the latest generation of spindle motors utilize a ferrofluidic seal between the shaft and the hub. Ferrofluidic seals are described in, for example, U.S. Pat. No. 5,473,484, which is incorporated herein by reference. A typical ferrofluidic seal consists of a ferrofluid, an axially polarized annular magnet and two magnetically permeable annular pole pieces attached to opposing faces of the magnet. The ferrofluid is conventionally composed of a suspension of magnetically permeable particles suspended in a fluid carrier. Generally, the magnet and the pole pieces are fixed to the hub and extend close to but do not touch the shaft. Magnetic flux generated by the magnet passes through the pole pieces and the shaft, which is also magnetically permeable, to magnetically hold the ferrofluid in magnetic gaps between the pole pieces and the shaft, thereby forming a seal.

One shortcoming of this design is that because the hub is separated from the shaft by grease or lubricant in the bearings and by the ferrofluid in the seal, the hub, spindle and discs build-up a considerable static electric charge while rotating. This leads to electrical arcs or sparks between the discs and the read/write heads, which are grounded, and results in the loss of information and/or permanent damage to the disc drive. This is particularly a problem for magnetic disc drives that typically use inductive or magnetoresistive heads, which are easily damaged by such an electrical discharge. Thus, a reliable, low resistance electrical pathway must be established between the spindle and electrical ground to discharge or eliminate the static electrical charge.

Several approaches have been attempted to provide a reliable, low resistance electrical pathway across the ferrofluidic seal. One approach is described in U.S. Pat. No. 4,604,229, to Raj et al. (RAJ), hereby incorporated by reference. RAJ teaches providing an electrically conducting ferrofluid, which electrically couples a rotating shaft to a housing through the pole pieces.

One problem with the approach taught in RAJ is the high resistance and often unreliable electrical connection between the pole pieces and the housing. This poor electrical connection is due to the small surface area at exterior circumferences of the pole pieces through which they contact the housing. These pole pieces typically have a thickness of less than 0.1 inches and often as little as 0.03 inches. Moreover, due to dimensions selected to facilitate the insertion of the ferrofluidic seal between the housing and the shaft, as well as manufacturing imperfections, the pole pieces generally are not in contact with the housing all the way around their circumference. In recognition of this, RAJ teaches that a snap ring, which primarily serves to hold the ferrofluidic seal in place, may be made of an electrically conducting material to increase electrical contact between the housing and one of the pole pieces (hereinafter the top pole piece). However, any increase in electrical conductivity between the top pole piece and the housing is more than offset by the teaching in RAJ of an o-ring seal between the other, lower pole piece and an inwardly projecting annular portion of the housing. The o-ring lifts the lower pole piece away from the housing, thereby reducing or eliminating contact therebetween and increasing the resistance of the electrical connection between the lower pole piece and the housing. In addition, if a grease, such as is frequently applied to o-rings, is used it migrates into interfacial spaces between the lower pole piece and the housing, further increasing the electrical resistance.

Another generally known approach for providing an electrical pathway across a ferrofluidic seal, which avoids some of the problems of the approach taught in RAJ, is described in U.S. Pat. No. 5,238,254, to Takii et al. (TAKII), hereby incorporated by reference. TAKII teaches using a conductive adhesive, such as a silver epoxy, to couple the pole pieces to the hub or housing. This approach has the additional advantage of being able to seal the lower pole piece to an inwardly projecting annular portion of the hub or housing without an o-ring, which as explained above can increase electrical resistance between the lower pole piece and the housing. However, while a significant improvement over RAJ, this approach is also not wholly satisfactory.

A fundamental problem with this approach is the increased manufacturing time and costs associated with applying the conducting adhesive, distributing it on surfaces to joined and baking the assembled pieces to cure the adhesive. Moreover, because it is necessary to spin test the spindle motor prior to final assembly, the conducting adhesive is generally applied to the upper and lower pole pieces in two separate steps. The lower pole piece is adhered to the hub in a first step prior to spin testing, and the top is adhered to the hub in a second step following a successful test. Thus, the assembled pieces must be baked twice, thereby further increasing the manufacturing time associated with this approach. Furthermore, should the spindle motor fail the spin test, the conducting adhesive generally prevents disassembly and repair of the spindle motor, thereby lower the yield of the manufacturing process. All of the above, i.e., increased manufacturing time and costs, and lowered yields, is extremely undesirable in an industry such as the disc drive industry in which competition has reduced profits to a thin margin. Finally, the use of electrically conductive adhesive is especially problematic in spindle motors used for disc drives because of the possibility of mis-applied or excess adhesive coming loose and contaminating the disc chamber or interfering with the bearings or the ferrofluidic seal itself.

Yet another generally known approach for providing an electrical pathway across a sealing member is described in U.S. Pat. No. 5,050,891, to Ishikawa (ISHIKAWA), hereby incorporated by reference. ISHIKAWA teaches providing an electrically conducting ferrofluid and an electrically conductive nonmagnetic coating or film over the surfaces of the pole pieces and magnet. The film can be chrome, gold or nickel, and is applied by plating, coating or by vapor deposition. The film need not be present over the entire surface of the sealing member. In one alternative, ISHIKAWA teaches applying a silver paste to only an internal circumference of the sealing member. Thus, it is clear that ISHIKAWA is focused solely on increasing a conducting area between the ferrofluid and the sealing member. Accordingly, a fundamental problem with the approach of ISHIKAWA is that it fails to teach a technique for increasing the electrical contact between the sealing member and a housing or hub. In fact, ISHIKAWA does not even mention such a housing or hub. It can be inferred that if the sealing member taught by ISHIKAWA is electrically connected to a hub, it is connected by one of the approaches outlined above, and therefore the resulting electrical pathway is unsuitable for the reasons given above.

Another problem with approach taught in ISHIKAWA is that applying an electrically conductive coating to the internal circumference of the sealing member decreases a radial gap separating it from the shaft or increases the magnetic gap (the separation between the pole pieces and the shaft), either of which is undesirable. The radial gap separating the sealing member from the shaft is typically less than 0.01 inch often as little as 0.004 inch. Thus, applying anything to the sealing member that reduces the radial gap increases the potential for damage to the sealing member or shaft during assembly or in operation, and hence is undesirable. Similarly, the strength of the magnetic flux that magnetically holds the ferrofluid between the pole pieces and the shaft, is inversely proportional to the size of the magnetic gap. Therefore, moving the sealing member away from the shaft to allow for the coating is likewise undesirable since it decreases the effectiveness of the seal. Finally, because of the time involved in applying the electrically conductive coating and the capital cost of equipment for doing so, the approach taught by ISHIKAWA results in increased manufacturing times and costs, which, as explained above, is extremely undesirable in the highly competitive disc drive industry. Consequently, the approach taught in ISHIKAWA is also not wholly satisfactory.

Accordingly, there is a need for a ferrofluidic seal that seals and electrically couples an outer surface of a shaft to an inner surface of a hub disposed about the shaft. It is desirable that the ferrofluidic seal provide an electrical pathway that is reliable and has low resistance. It is also desirable that a method for forming such a ferrofluidic seal not increase manufacturing time or costs for assembling a spindle motor in which the seal is used.

The present invention provides a solution to these and other problems, and offers other advantages over the prior art.

SUMMARY OF THE INVENTION

The present invention relates to a method and apparatus for sealing and electrically connecting an outer surface of a shaft to an inner surface of a hub disposed about the shaft that solves these problems.

According to one embodiment, a seal is provided having an annular magnet, with a pair of annular pole pieces coupled to opposite poles thereof. The magnet and the pole pieces are positioned between the shaft and the hub. The magnet has an interior radius that is larger than a radius of the outer surface of the shaft. The pole pieces have interior radii that are larger than the radius of the outer surface of the shaft but smaller than the interior radius of the magnet. The hub, shaft and pole pieces contain electrically conductive materials, and, in addition, the pole pieces and the shaft are also magnetically permeable. A nonmagnetic, electrically conductive ring electrically couples the pole pieces to one another and to the hub. The electrically conductive ring can be made of brass, chromium, copper, gold, nickel or alloys thereof. An electrically conductive ferrofluid is magnetically held between the pole pieces and the outer surface of the shaft to form a pair of axially separated seals, and to establish parallel electrical pathways between the hub and the shaft. The ferrofluid is magnetically held between each of the pole pieces and the outer surface of the shaft by a magnetic flux provided by the magnet and concentrated by the pole pieces.

The present invention is particularly useful for use in a spindle motor, such as used in a disc drive. A spindle motor generally has a base with a shaft coupled thereto, and a hub having an inner surface disposed about an outer surface of the shaft. An embodiment of a seal according to the present invention is positioned between the shaft and the hub to seal the outer surface of the shaft to the inner surface of the hub and to electrically couple the shaft to the hub.

In one version of this embodiment, the electrically conductive ring includes an annular disk having an interior radius larger than the interior radii of the pole pieces and an exterior radius substantially the same as exterior radii of the pole pieces and the magnet. The electrically conductive ring also includes one or more tabs projecting from the exterior radius. The annular disk is positioned concentric with and abutting one of the pole pieces, and the are folded over the magnet and the other pole piece to electrically couple the pole pieces to one another. In one preferred version, the inner surface of the hub has an annular shoulder, and the annular disk is positioned abutting the shoulder to electrically couple the pole pieces to the hub. In another version, the electrically conductive ring includes a band, having an interior radius substantially the same as the exterior radii of the pole pieces and the magnet, and circumferentially disposed about the pole pieces and the magnet. The band has a first edge and a second edge, each edge having one or more inwardly projecting tabs to electrically couple the pole pieces to one another.

In another aspect, the present invention is directed to a method of sealing and electrically coupling an outer surface of a shaft to an inner surface of a hub disposed about the shaft. In the method, a laminate is formed by fixing a pair of annular pole pieces to opposite poles of a magnet. The laminate is formed so as to have an exterior radius that is substantially the same as a radius of the inner surface of the hub, and an interior radius that is larger than a radius of the outer surface of the shaft. A nonmagnetic, electrically conductive ring is attached to the laminate so that the pole pieces are electrically coupled to one another. Then, the laminate, with the electrically conductive ring attached, is positioned between the outer surface of the shaft and the inner surface of the hub so that the electrically conductive ring electrically couples the hub to the pole pieces. An electrically conductive ferrofluid is injected between the laminate and the outer surface of the shaft to form a seal and to establish an electrical pathway therebetween. Preferably, the electrically conductive fluid is injected between each of the pole pieces and the outer surface of the shaft to form a pair of axially separated seals and to establish parallel electrical pathways therebetween. In one version, the electrically conductive ring includes an annular disk with an interior radius larger than the interior radius of the laminate and an exterior radius substantially the same as the exterior radius of the laminate. the electrically conductive ring further includes one or more tabs projecting from exterior radius of the annular disk. In this version, the electrically conductive ring can be attached to the laminate, for example, by placing the annular disk in a position concentric with and abutting one of the pole pieces, and folding the tabs over the laminate to electrically connect with the other pole piece so that the pole pieces are electrically coupled to one another. In one prefered embodiment of this version, the inner surface of the hub has an annular shoulder, and the laminate is positioned between the outer surface of the shaft and the inner surface of the hub so that the annular disk abuts the shoulder to electrically couple the hub to the pole pieces. Alternatively, the electrically conductive ring can include a band having an interior radius substantially the same as the exterior radius of the laminate and circumferentially disposed about the laminate. The band has first and second edges, each with one or more tabs projecting therefrom. The tabs are bent inward to attach the electrically conduction ring to the laminate and to electrically connect with the pole pieces so that the pole pieces are electrically coupled to one another.

In yet another aspect, the present invention is directed to a seal for sealing and electrically connecting an outer surface of a shaft to an inner surface of a hub disposed about the shaft, the seal having means for electrically coupling pole pieces to one another and to the hub to establish parallel electrical pathways between the hub and the shaft. As in the embodiments described above, the seal includes a magnet positioned between the shaft and the hub, and having poles to which the annular pole pieces are fixed. The pole pieces have interior radii that are larger than a radius of the outer surface of the shaft. An electrically conductive ferrofluid is magnetically held between each of the pole pieces and the outer surface of the shaft by a magnetic flux provided by the magnet through the pole pieces to form a pair of axially separated seals between the hub and the shaft. The means for electrically coupling the pole pieces to one another and to the hub generally involves a nonmagnetic, electrically conductive material. The nonmagnetic electrically conductive material can be aluminum, brass, copper, gold, nickel or alloys thereof. In one prefered embodiment, the means for electrically coupling the pole pieces includes an annular disk having an interior radius larger than the interior radii of the pole pieces and an exterior radius substantially as the exterior radii of the pole pieces. The means further includes one or more tabs projecting from the exterior radius. The annular disk is positioned concentric with and abutting one of the pole pieces, and the tabs are folded over the other pole piece to electrically couple the pole pieces to one another.

These and various other features as well as advantages which characterize the present invention will be apparent upon reading of the following detailed description and review of the associated drawings.

DETAILED DESCRIPTION

Figure 1:
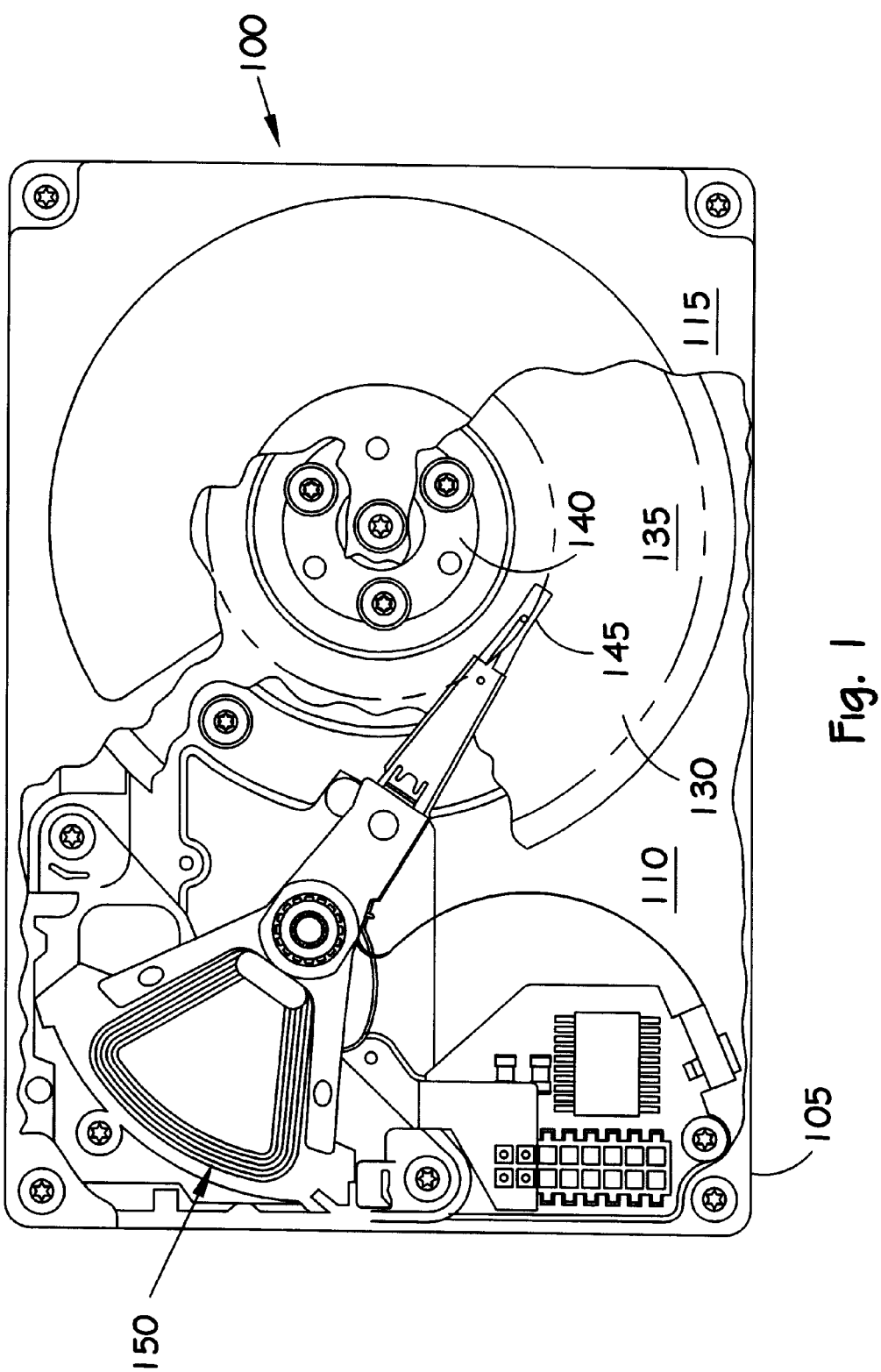
FIG. 1 is a plan view of a disk drive in which a spindle motor incorporating a ferrofluidic seal according to an embodiment of the present invention is especially useful.

FIG. 1 is a plan view of a magnetic disc drive for which a spindle motor having a ferrofluidic seal according to the present invention is particularly useful. Referring to FIG. 1, a disc drive 100 typically includes a housing 105 having a base 110 joined to a cover 115. A number of discs 130 having surfaces 135 covered with a magnetic media (not shown) for magnetically storing information are attached to a spindle 140. A spindle motor (not shown in this figure) turns the spindle 140 to rotate the discs 130 past read/write heads 145 which are suspended above surfaces 135 of the discs by a suspension arm assembly 150. In operation, the discs 130 are rotated at high speed past the read/write heads 145 while the suspension arm assembly 150 moves the read/write heads in an arc over a number of radially spaced tracks (not shown) on the surfaces 135 of the discs 130. Thus, enabling the read/write heads 145 to read and write magnetically encoded information to the magnetic media on the surfaces 135 of the discs 130 at selected locations.

Figure 2:
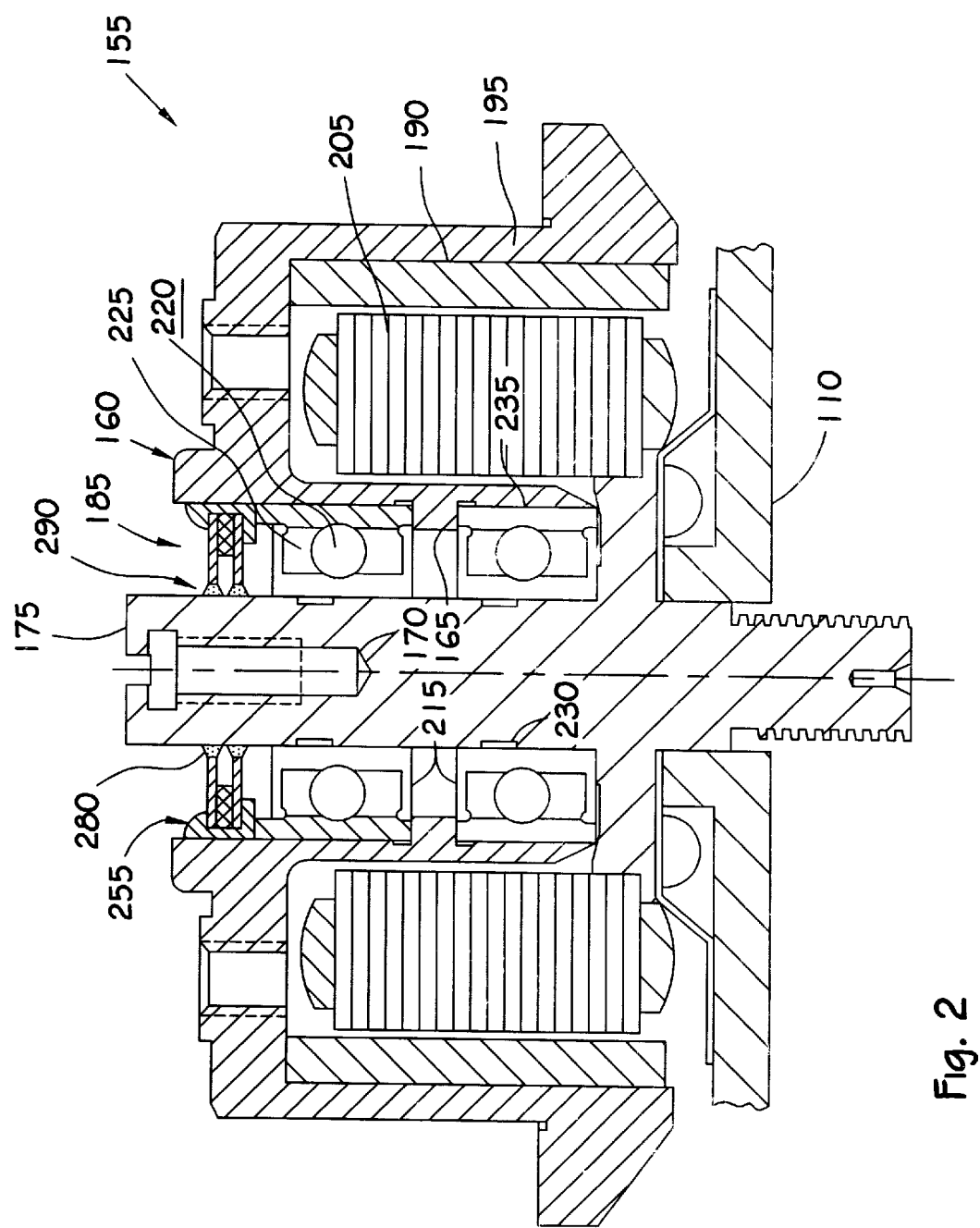
FIG. 2 is a sectional side view of an embodiment of a spindle motor incorporating a ferrofluidic seal according to an embodiment of the present invention.

FIG. 2 is a sectional side view of a spindle motor 155 of a type which is especially useful in disc drives 100. Typically the spindle motor 155 includes a rotatable hub 160 having an inner surface 165 disposed about an outer surface 170 of a shaft 175. A ferrofluidic seal 185 according to the present invention seals and electrically connects the outer surface 170 of the shaft 175 to the inner surface 165 of the hub 160. One or more magnets 190 attached to a periphery 195 of the hub 160 interact with a stator winding 205 attached to the base 110 to cause the hub 160 to rotate. The hub 160 is supported on the shaft 175 by one or more bearings 215. The bearings 215 can be either a ball-bearing (as shown) or a fluid-dynamic bearing (not shown). A ball-bearing generally includes one or more balls 220 loosely held by a retainer 225 between an inner race 230 and an outer race 235. Interfacial spaces 245 between the balls 220, the retainer 225 and the inner and outer races 230,235, are filled with a lubricating fluid or grease to facilitate movement of the balls 220. In a fluid-dynamic bearing, a lubricating fluid, such as gas or a liquid, provides a bearing surface between the hub 160 and the shaft 175. Dynamic pressure-generating grooves (not shown) formed in races on the inner surface 165 of the hub 160 or the outer surface 170 of the shaft 175 generate a localized area of high pressure which radially supports the hub. Preferably, regardless of the type of bearings 215 used, the outer race 235 forms a raised annular shoulder 250 or ledge around the inner surface 165 of the hub 160 against which the ferrofluidic seal 185 is held.

Figure 3:
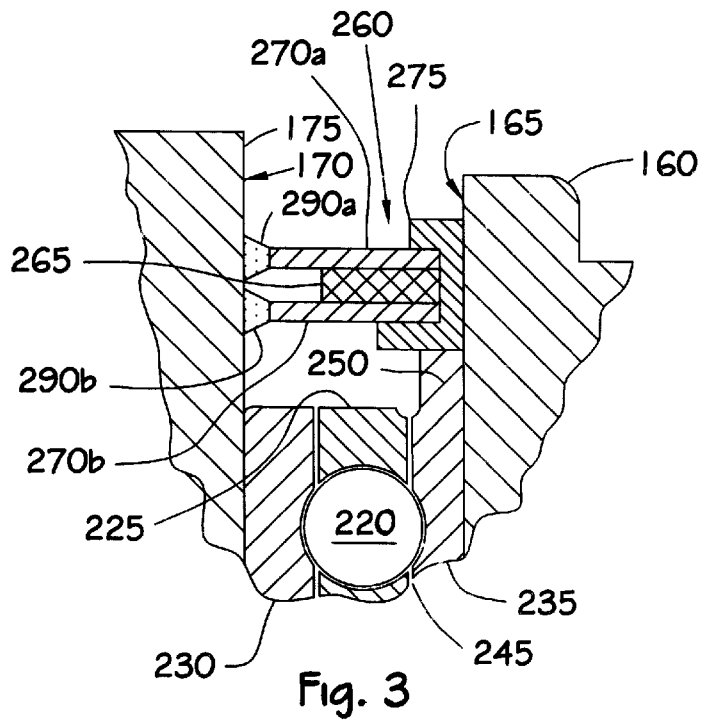
FIG. 3 is a partial sectional view of the spindle motor of FIG. 2 showing an embodiment of a ferrofluidic seal having a conducting ring according to the present invention.

An embodiment of the ferrofluidic seal 185 will now be described in detail with reference to FIG. 3. The ferrofluidic seal 185 can be attached to the hub 160 and rotate about the shaft 175 (as shown), or it can be attached to the shaft and the hub rotated relative to the ferrofluidic seal (not shown). In FIG. 3, the ferrofluidic seal 185 is inserted in to the hub 160 so as to engage the shoulder 250 around the inner surface 165, and is fixedly attached to the hub using an epoxy 255. Preferably, the ferrofluidic seal 185 has an exterior radius that is substantially the same as, or slightly smaller than, an interior radius of the inner surface 165. More preferably, the epoxy 255 is applied in such a way as to substantially completely seal the exterior radius of the ferrofluidic seal 185 to the hub 165.

The ferrofluidic seal 185 includes a laminate 260 consisting of a permanent magnet 265 and two annular pole pieces (singularly 270a and 270b) coupled to opposite poles thereof. The pole pieces 270a, 270b, are electrically conductive and magnetically permeable, as are the shaft 175 and the hub 160. The magnet 265 can also be electrically conductive, but it need not be in order to provide a reliable, low resistance electrical pathway the hub 160 and the shaft 175 in accordance with the present invention. A nonmagnetic, electrically conductive ring 275 electrically couples or connects the pole pieces 270a, 270b, to one another and to the hub 160. An electrically conductive ferrofluid 280 is magnetically held in magnetic gaps 285 between each of the pole pieces 270a, 270b, and the outer surface 170 of the shaft 175 to form a seal 290 and to establish an electrical pathway between the hub 160 and the shaft. The ferrofluid 280 is magnetically held between each of the pole pieces 270a, 270b, and the outer surface 170 of the shaft 175 by a magnetic flux provided by the magnet 265 and concentrated by the pole pieces.

The magnet 265 can be made of any suitable magnetic material. For example, the magnet 265 can include a magnetic alloy or a plastic or ceramic material that is impregnated with a magnetic powder, such as hexaferrites, ferrite or iron oxide. Preferably, to provide a reliable seal the magnet 265 has a magnetic strength of at least about 200 gauss, and more preferably at least about 2,000 gauss. To provide a uniform seal around the shaft 175, the magnet 265 is an axially polarized, annular magnet with an interior radius that is larger than a radius of the outer surface 170 of the shaft 175.

The pole pieces 270a, 270b, can be made of any suitable magnetically permeable material, and also have interior radii that are larger than the radius of the outer surface 170 of the shaft 175. Optionally, the pole pieces 270a, 270b, have interior radii that are smaller than the interior radius of the magnet to form a reservoir for any displaced ferrofluid 280, and to form a pair of axially separated seals (singularly 290a and 290b) and to establish parallel electrical pathways between the hub 160 and the shaft 175.

The electrically conducting ferrofluid 280 can be any commercially available ferrofluid which is sufficiently electrically conducting. Such ferrofluids typically include ferromagnetic particles, such as $Fe_3O$ or magnetite, colloidally suspended in a carrier fluid, such as synthetic a ester based fluid or hydrocarbon. Preferably, to provide a reliable, low resistance electrical pathway the electrically conductive ferrofluid 280 has a resistivity of less than about 10000 ohm-cm, and more preferably less than about 10000 ohms-cm.

The electrically conductive ring 275 electrically couples or connects the pole pieces 270a, 270b, to one another and to the hub 160. It can be made of a metal or of an electrically conductive ceramic or polymeric material. Preferably, to provide a low resistance electrical pathway the electrically conductive ring 275 is made of a nonmagnetic metal such as aluminum, brass, chromium, copper, gold, nickel or alloys thereof. The electrically conductive ring 275 is made from a nonmagnetic material to prevent forming a magnetic short across the poles of the magnet 265, weakening the magnet flux through the magnetic gaps 285 and reducing the effectiveness of the ferrofluidic seal 185.

Figure 4:
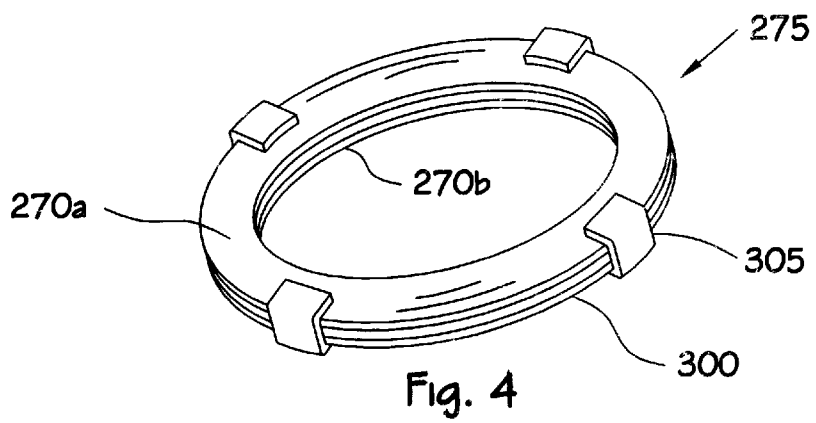
FIG. 4 is a perspective view of an embodiment of a ferrofluidic seal having a conducting ring according to the present invention.

In one embodiment, shown in FIG. 3 and FIG. 4, the electrically conductive ring 275 includes an annular disk 300 having an interior radius larger than the interior radii of the pole pieces 270a, 270b, and an exterior radius with one or more tabs 305 projecting therefrom. The annular disk 300 is positioned concentric with and abutting one of the pole pieces 270b, and the tabs 305 are folded over the magnet 265 and the other pole piece 270a to electrically couple the pole pieces to one another. The annular disk 300 is in electrical contact with the hub 160 across substantially the entire radial surface of the shoulder 250 on the inner surface 165 of the hub. Thus, a significant advantage of the electrically conductive ring 275 of the present invention is that it does not rely on incidental contact between exterior edges of the pole pieces 270a, 270b, and the hub 160 to provide electrical continuity between pole pieces 270a, 270b, and the hub 160, as in earlier designs. Another advantage is that the electrically conductive ring 275 serves to hold the pole pieces 270a, 270b, in position on the poles of the magnetic 265 thereby simplifying assembly of the ferrofluidic seal 185 and enhancing magnetic coupling between the magnet and the pole pieces by eliminating the need for an adhesive therebetween.

Figure 5:
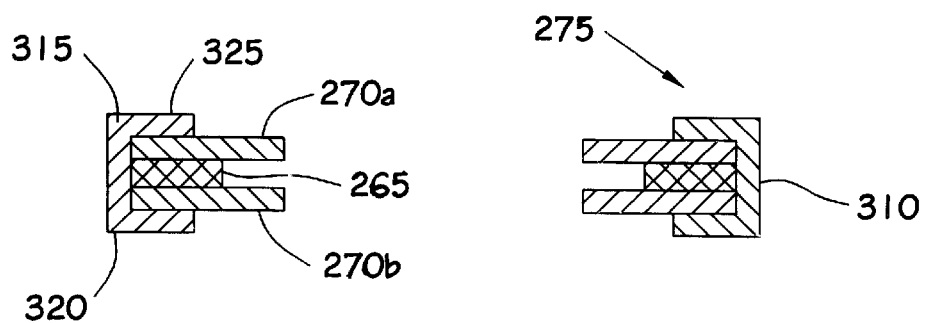
FIG. 5 is a sectional side view of another embodiment of a ferrofluidic seal having a conducting ring according to the present invention.

In another embodiment, shown in FIG. 5, the electrically conductive ring includes a cylindrical band 310 having an interior radius substantially the same as the exterior radius of the laminate 260 and circumferentially disposed about the laminate. The band 310 has a first edge 315 and a second edge 320, each edge having one or more tabs 325 projecting therefrom. The tabs 325 are folded over inward to electrically connect with the pole pieces 270a, 270b, to electrically couple them to one another. The band 310 is sized to provide an interference fit with the inner surface of the hub, thereby providing electrical contact with the hub across substantially the entire portion of the inner surface opposite the ferrofluidic seal 185. Additional electrical contact is provided between the tabs 325 on the second edge 320 and the shoulder 250 on the hub 160. Optionally, the band 310 can be split axially along its outer circumference to produce a spring effect that presses the band against the inner surface 165 of the hub 160 further insuring electrical contact. This is split band 310 embodiment is particularly useful for use in spindle motors 155 in which the hub 160 does not have a shoulder 250 on the inner surface 165.

Figure 6:
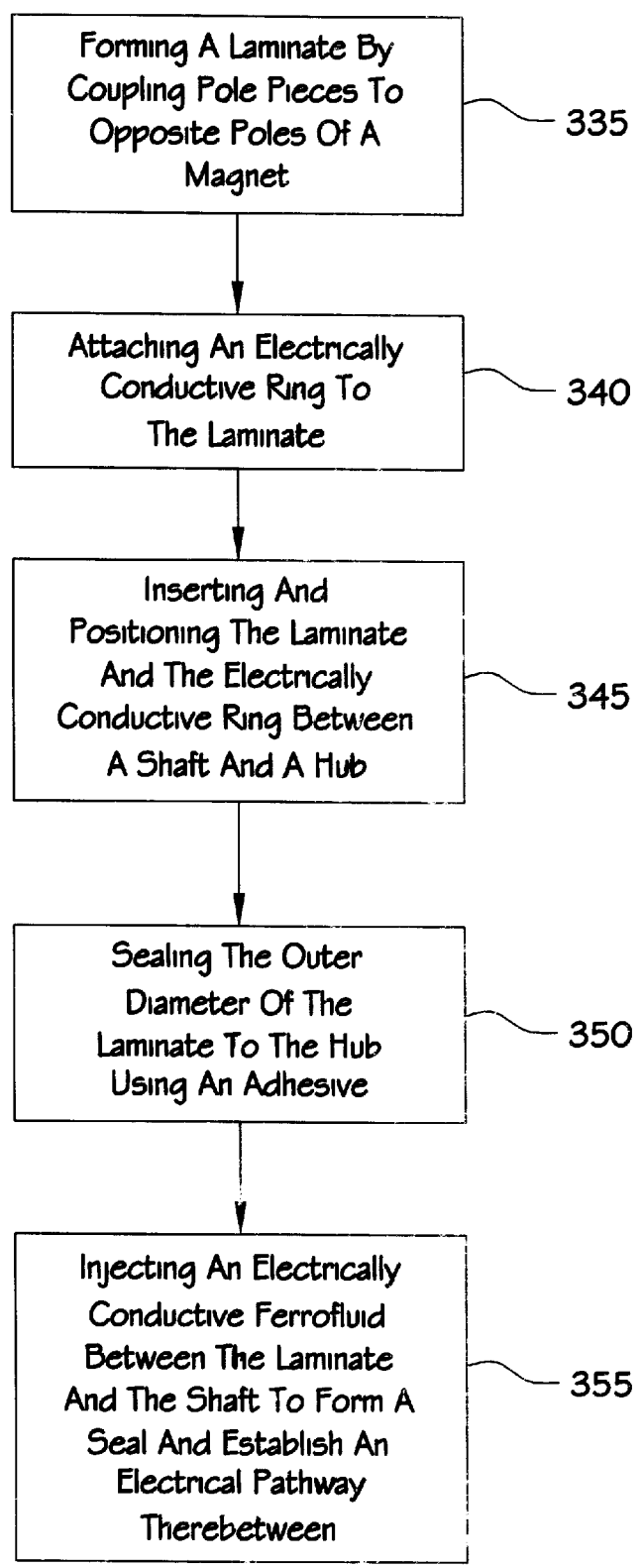
FIG. 6 is a flowchart showing an embodiment of a process for manufacturing a spindle motor incorporating an embodiment of a ferrofluidic seal having a conducting ring according to the present invention.

A process for sealing and electrically coupling the inner surface 165 of the hub 160 to the outer surface 170 of the shaft 175 will now be described with reference to FIG. 6. FIG. 6 is a flowchart showing an embodiment of a process for assembling and installing a ferrofluidic seal 185 having an embodiment of a electrically conductive ring 275 according to the present invention in a spindle motor 155. In a lamination step 335, a the pole pieces 270a, 270b, are coupled to opposite poles of the magnet 265 to form the laminate 260. The pole pieces 270a, 270b can be coupled to the poles of the magnet solely by magnetic attraction or they can be fixed to the magnet by mechanical means, such as with an adhesive. Preferably, for reasons given above, the pole pieces 270a, 270b are held in place at this point solely by magnetic attraction. Next, in an assembly step 340, the electrically conductive ring 275 is attached to the laminate 260 to electrically couple the pole pieces 270a, 270b to one another. This can be accomplished, for example, by placing an annular disk 300 in a position concentric with and abutting one of the pole pieces 270b, and folding tabs 305 over the laminate 260 to electrically connect with the other pole piece 270a. Alternatively, the electrically conductive ring 275 can include a band 310 having first and second edges 315, 320, with one or more tabs 325 projecting therefrom. In this version, the band 310 is attached to the laminate 260 by placing it circumferentially about the laminate, and folding or bending the tabs 325 inward to electrically connect with the pole pieces 270a, 270b. The laminate 260, with the electrically conductive ring 275 attached thereto, is then positioned between the outer surface 170 of the shaft 175 and the inner surface 165 of the hub 160 in an positioning step 345, so that the electrically conductive ring 275 electrically couples the hub to the pole pieces 270a, 270b. Optionally, in a sealing step 350 the outer diameter of the laminate 260 is sealed to the inner surface 165 of the hub 160 using an adhesive. Finally, an electrically conductive ferrofluid 280 is injected between the laminate 260 and the outer surface 170 of the shaft 175 in an injection step 355 to form a seal 290 and to establish an electrical pathway therebetween. Preferably, the electrically conductive ferrofluid 280 is injected between each of the pole pieces 270a, 270b and the outer surface 170 of the shaft 175 so as to form a pair of axially separated seals 290a, 290b and to establish parallel electrical pathways therebetween. In another embodiment of the above process, the assembly step 340 and the positioning step 345 are combined, so that inserting the laminate 260 and electrically conducting ring 275 in to the hub 160 folds the tabs 305 or 325 inward to electrically contact one or more of the pole pieces 270a, 270b.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, although the preferred embodiment described herein is directed to a motor having a ferrofluidic seal is attached to a hub that rotates about a shaft, it will be appreciated by those skilled in the art that the teachings of the present invention can be adapted to motors in which the ferrofluidic seal is attached to the shaft and the hub rotates relative to the ferrofluidic seal. In such an embodiment, the electrically conductive ring is disposed about the interior radii of the pole pieces, and electrically couples them to the shaft. Also, the purpose for establishing electrical continuity through the ferrofluidic seal is described as grounding the hub and the shaft, electrical continuity may be desirable other reasons, such as electrically biasing the hub. Thus, the scope of the appended claims should not be limited to the preferred embodiments described herein.

what is claimed is:

1. A seal for sealing and electrically connecting an outer surface of a shaft to an inner surface of a hub disposed about the shaft, the shaft and hub being electrically conductive material, and the shaft being magnetically permeable, the seal comprising:
    (a) an annular magnet with a pair of annular pole pieces coupled to opposite poles thereof positioned between the shaft and the hub, the magnet having an interior radius that is larger than a radius of the outer surface of the shaft, and the pole pieces comprising an electrically conductive material which is magnetically permeable, and having interior radii that are larger than the radius of the outer surface of the shaft but smaller than the interior radius of the magnet;
    (b) a nonmagnetic electrically conductive ring to electrically couple the pole pieces to one another and to the hub wherein the electrically conductive ring comprises an annular disk having an interior radius larger than the interior radii of the pole pieces and an exterior radius with one or more tabs projecting therefrom, the exterior radius being substantially the same as exterior radii of the pole pieces and the magnet, wherein the electrically conductive ring is split axially along its outer circumference to establish a spring effect to press the ring against the inner surface of the hub and wherein the annular disk is positioned concentric with and abutting one of the pole pieces, and the tabs are folded over the magnet and the other pole piece to electrically couple the pole pieces to one another; and
    (c) an electrically conductive ferrofluid magnetically held between each the pole pieces and the outer surface of the shaft to form a pair of axially separated seals, and to establish parallel electrical pathways between the hub and the shaft.

2. A seal according to claim 1 wherein the inner surface of the hub comprises an annular shoulder, and wherein the annular disk is positioned abutting the shoulder to electrically couple the pole pieces to the hub.

3. A seal according to claim 1 wherein the electrically conductive ring comprises a band, having an interior radius substantially the same as exterior radii of the pole pieces and the magnet, circumferentially disposed about the pole pieces and the magnet, the band comprising a first edge and a second edge, each edge having one or more inwardly projecting tabs to electrically couple the pole pieces to one another.

4. A spindle motor for use in a disc drive, the spindle motor comprising:
    (a) a base;
    (b) a shaft coupled to the base, the shaft having an outer surface;
    (c) a hub having an inner surface disposed about the shaft; and
    (d) a seal positioned between the shaft and the hub, the seal adapted to seal the outer surface of the shaft to the inner surface of the hub and to electrically couple the shaft to the hub, the seal comprising:
        (i) a magnet with a pair of annular pole pieces fixed to opposite poles thereof, the pole pieces having interior radii that are larger than a radius of the outer surface of the shaft;

(ii) a nonmagnetic electrically conductive ring to electrically couple the pole pieces to one another and to the hub wherein the electrically conductive ring comprises an annular disk having an interior radius larger than the interior radii of the pole pieces and an exterior radius with one or more tabs projecting therefrom, the exterior radius being substantially the same as exterior radii of the pole pieces, wherein the electrically conductive ring is split axially along its outer circumference to establish a spring effect to press the ring against the inner surface of the hub and wherein the annular disk is positioned concentric with and abutting one of the pole pieces, and the tabs are folded over the other pole piece to electrically couple the pole pieces to one another; and (iii) an electrically conductive ferrofluid magnetically held between each of the pole pieces and the outer surface of the shaft to form a pair of axially separated seals therebetween, and to establish parallel electrical pathways between the hub and the shaft.

5. A spindle motor according to claim 4 wherein the inner surface of the hub comprises an annular shoulder, and wherein the annular disk is positioned abutting the shoulder to electrically couple the pole pieces to the hub.

6. A spindle motor according to claim 4 wherein the electrically conductive ring comprises a band having an interior radius substantially the same as exterior radii of the pole pieces and circumferentially disposed about the pole pieces, the band comprising a first edge and a second edge, each edge having one or more inwardly projecting tabs to electrically couple the pole pieces to one another.

7. A spindle motor according to claim 4 wherein the electrically conductive ring comprises aluminum, brass, chromium, copper, gold, nickel or alloys thereof.

8. A spindle motor according to claim 4 wherein the ferrofluid is magnetically held between each of the pole pieces and the outer surface of the shaft by a magnetic flux provided by the magnet and concentrated by the pole pieces.

9. A spindle motor according to claim 4 wherein the hub, shaft and pole pieces comprise an electrically conductive material, and wherein the pole pieces and the shaft are magnetically permeable.

10. A method of scaling and electrically coupling an outer surface of a shaft to an inner surface of a hub disposed about the shaft, the method comprising steps of:

(a) forming a laminate including a magnet with a pair of annular pole pieces fixed to opposite poles thereof, the laminate having an exterior radius that is substantially the same as a radius of the inner surface of the hub, and an interior radius that is larger than a radius of the outer surface of the shaft;

(b) attaching a nonmagnetic electrically conductive ring to the laminate to electrically couple the pole pieces to one another the electrically conductive ring comprises an annular disk having an interior radius larger than the interior radius of the laminate and an exterior radius with one or more tabs projecting therefrom, the exterior radius of the annular disk being substantially the same as the-exterior radius of the laminate wherein the electrically conductive ring is split axially along its outer circumference to establish a spring effect to press the ring against the inner surface of the hub, and wherein step (b) includes steps of:

(b)(i) placing the annular disk in a position concentric with and abutting one of the pole pieces; and (b)(ii) folding the tabs over the laminate to electrically connect with the other pole piece so that the pole pieces are electrically coupled to one another;

(c) positioning the laminate with the electrically conductive ring attached thereto between the outer surface of the shaft and the inner surface of the hub so that the electrically conductive ring electrically couples the hub to the pole pieces; and (d) injecting an electrically conductive ferrofluid between the laminate and the outer surface of the shaft to form a seal and to establish an electrical pathway therebetween.

11. A method according to claim 10 wherein step (d) comprises the step of injecting the electrically conductive fluid between each of the pole pieces and the outer surface of the shaft to form a pair of axially separated seals and to establish parallel electrical pathways therebetween.

12. method according to claim 10 wherein the inner surface of the hub comprises an annular shoulder, and wherein step (c) includes the step of positioning the laminate with the electrically conductive ring attached thereto between the outer surface of the shaft and the inner surface of the hub so that the electrically conductive ring abuts the shoulder to electrically couple the hub to the pole pieces.

13. A method according to claim 10 wherein the electrically conductive ring comprises a band having an interior radius substantially the same as the exterior radius of the laminate and circumferentially disposed about the laminate, the band comprising a first edge and a second edge, each edge having one or more tabs projecting therefrom, and wherein step (b) includes the step of bending the tabs inward to electrically connect with the pole pieces so that the pole pieces are electrically coupled to one another.

14. A seal for sealing and electrically connecting an outer surface of a shaft to an inner surface of a hub disposed about the shaft, the seal comprising:

(a) a magnet with a pair of annular pole pieces fixed to opposite poles thereof positioned between the shaft and the hub, the pole pieces having interior radii that arc larger than a radius of the outer surface of the shaft;

(b) an electrically conductive ferrofluid magnetically held between each of the pole pieces and the outer surface of the shaft by a magnetic flux provided by the magnet through the pole pieces to form a pair of axially separated seals between the hub and the shaft; and (c) means for electrically coupling the pole pieces to one another and to the hub to establish parallel electrical pathways between the hub and the shaft, the means comprising a nonmagnetic electrically conductive material and including means to establish a spring effect to press the means for electrically coupling against an interior surface of the hub.

15. A seal according to claim 14 wherein the means for electrically coupling the pole pieces comprises a annular disk having an interior radius larger than the interior radii of the pole pieces and an exterior radius with one or more tabs projecting therefrom, the exterior radius being substantially the same as exterior radii of the pole pieces, and wherein the annular disk is positioned concentric with and abutting one of the pole pieces, and the tabs are folded over the other pole piece to electrically couple the pole pieces to one another.

16. A seal according to claim 15 wherein the inner surface of the hub comprises an annular shoulder, and wherein the annular disk is positioned abutting the shoulder to electrically couple the pole pieces to the hub.

17. A seal according to claim 14 wherein the nonmagnetic electrically conductive material comprises brass, chromium, copper, gold, nickel or alloys thereof.

* * * * *